UNITED STATES PATENT OFFICE.

JOSEPH W. HARMON, OF WILLIAMSBURG, NEW YORK, ASSIGNOR TO HUMPHREY B. DUNHAM, OF NEWARK, NEW JERSEY.

IMPROVEMENT IN BLEACHING ROSIN.

Specification forming part of Letters Patent No. 4,970, dated February 20, 1847.

*To all whom it may concern:*

Be it known that I, JOSEPH W. HARMON, of Williamsburg, Kings county, and State of New York, have invented a new and useful Art of Bleaching Rosin White; and I do hereby declare that the following is a full and exact description.

The nature of my invention consists in the art of making rosin white by submitting the same to a boiling-heat and applying to the same a quantity of alkali and water.

To enable others skilled in the arts to make and use my invention, I will proceed to describe the process.

I take about twelve gallons of lye prepared from pearlash, soda-ash, or vanilla, being previously decarbonated or made caustic by the action of lime or a lye prepared by dissolving potash. The strength of the lye by the alkalimeter may be from five to ten degrees. This quantity of lye is heated along with a barrel of rosin until the lye boils through the rosin. I then pour into the vessel containing the boiling rosin and alkali about fifteen gallons of boiling water, continuing to apply heat and using the precaution of frequently stirring to prevent burning, and also to thoroughly incorporate the rosin with the alkaline lye. The boiling may be continued for about five minutes, the heat is then removed, the rosin being continually mixed or worked up with the lye as long as it is sufficiently soft for that purpose. I then draw off the liquid and add about fifteen gallons boiling water, with which I again work up the rosin, the water washing out the coloring-matter which had been previously acted on by the lye. This is to be repeated, provided the rosin has failed of being sufficiently cleansed.

What I claim as new and as my invention, and desire to secure by Letters Patent, is—

The mode of bleaching rosin white by means of alkali, artificial heat, and water combined and connected in process, substantially as herein described, so as to extract the coloring-matter from the rosin.

J. W. HARMON. [L. S.]

Witnesses:
A. W. O. SPOONER,
C. A. SPAFORD.